Figure 1:
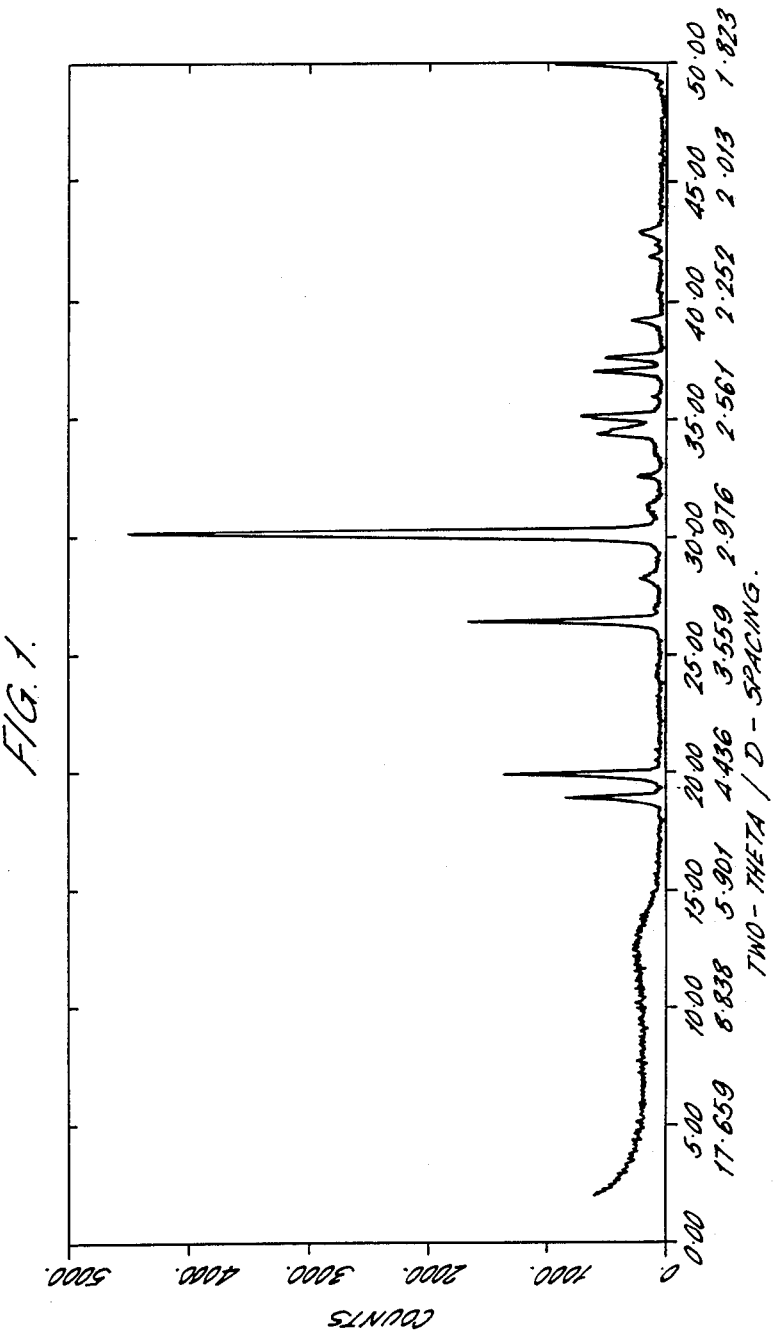

United States Patent [19]

Anseau et al.

[11] Patent Number: 4,866,013
[45] Date of Patent: Sep. 12, 1989

[54] PROCESS FOR MAKING AN IMPROVED CERAMIC MATERIAL

[76] Inventors: Michael R. Anseau, 39 Popes Lane, London W5; James M. Lawson, 47 Eastcote Lane, South Harrow Middlesex HA2 8DE; Shaun Slasor, 19 Marlborough Court, Marlborough Hill Harrow on the Hill, all of United Kingdom

[21] Appl. No.: 190,695

[22] Filed: May 5, 1988

Related U.S. Application Data

[62] Division of Ser. No. 54,327, May 26, 1987, Pat. No. 4,804,644.

[30] Foreign Application Priority Data

May 28, 1986 [GB] United Kingdom ............... 8612938
Oct. 22, 1986 [GB] United Kingdom ............... 8625342

[51] Int. Cl.$^4$ ............................................. C04B 35/58
[52] U.S. Cl. ..................................... 501/97; 501/96; 501/98; 501/105; 501/106; 264/65; 264/66
[58] Field of Search ............ 501/96, 97, 98, 106, 501/105; 264/65, 66

[56] References Cited

U.S. PATENT DOCUMENTS

| | | | |
|---|---|---|---|
| 4,069,058 | 1/1978 | Washburn | 501/106 |
| 4,069,059 | 1/1978 | McDonough et al. | 501/106 |
| 4,243,621 | 1/1981 | Mori et al. | 264/65 |
| 4,499,193 | 2/1985 | Phelps et al. | 501/98 |
| 4,640,902 | 2/1987 | Lange | 501/105 |
| 4,716,028 | 12/1987 | Kasai et al. | 501/97 |
| 4,769,350 | 7/1988 | Nishioka et al. | 501/98 |
| 4,770,830 | 7/1988 | Arakawa et al. | 264/66 |
| 4,804,644 | 2/1989 | Anseau et al. | 501/96 |

FOREIGN PATENT DOCUMENTS

| | | | |
|---|---|---|---|
| 4509 | 10/1979 | European Pat. Off. | 501/97 |
| 45-7177 | 3/1970 | Japan | 264/65 |
| 61-266358 | 11/1986 | Japan | |
| 3089461 | 5/1988 | Japan | |
| 3139058 | 6/1988 | Japan | |
| 3260869 | 10/1988 | Japan | |
| 541823 | 1/1977 | U.S.S.R. | |

*Primary Examiner*—William R. Dixon, Jr.
*Assistant Examiner*—Sue Hollenbeck

[57] ABSTRACT

A ceramic material which comprises a composite of zirconia and O'-sialon or silicon oxynitride.

The ceramic material may comprise a dispersion of zirconia in an O'-sialon matrix and such a dispersion is obtained when the amount of zirconia is from 5 to 30 volume percent, preferably 15 to 25 volume percent, based on the total volume of the composition.

6 Claims, 5 Drawing Sheets

10μm

PROCESS FOR MAKING AN IMPROVED CERAMIC MATERIAL

This is a division of application Ser. No. 054,327 filed May 26, 1987 now U.S. Pat. No. 4,804,644.

The present invention relates to an improved ceramic material and, in particular, to an improved engineering ceramic material.

Engineering ceramics are materials such as the oxides, nitrides and carbides of the metals silicon, aluminium, boron and zirconium. They are characterized by great strength and hardness; properties which in theory can be retained to very high (>1000° C.) temperatures. Two of the most promising types of ceramic are the sialon family, and the zirconia family.

The sialons are based on the elements Si, Al, O, N, hence the acronym. A successful commercial sialon is the $\beta'$-sialon which has the $\beta$-$Si_3N_4$ crystal structure, but with some of the silicon atoms replaced by aluminium atoms, and for valency balance some nitrogen atoms replaced by oxygen atoms. The sialons are usually formed by mixing $Si_3N_4$, $Al_2O_3$, ALN with a metal oxide (often $Y_2O_3$), compacting the powder to the desired shape, and then firing the component at ~1750° C. for a few hours. The function of the metal oxide is to react with the alumina and the silica layer (which is always present on the surface of each silicon nitride particle), to form a liquid phase which dissolves the reactants and precipitates the product. The liquid phase (which still contains dissolved nitrides), cools to form a glass between the $\beta'$-sialon grains. Typically, an $Y_2O_3$ densified $\beta'$sialon contains about 15 volume percent of Y-Si-Al-O-N glass and 85 volume percent $\beta'$-sialon. At temperatures above 800° C. this glass begins to soften and the strength decreases. The glass/sialon can be heat treated at ~1300° C. to crystallise the glass. In the case of $\beta'$-sialon and glass, the glass crystallises to give $Y_3Al_5O_{12}$ (yttro garnet or YAG) and a small amount of additional $\beta'$-sialon. With glass/O'-sialon the crystallisation produces $Y_2Si_2O_7$ (yttrium disilicate) plus a small amount of additional O'-sialon. This crystallisation process reduces the room temperature strength of the material, but this reduced strength is maintained to higher temperature. The reason that crystallisation reduces strength is not completely understood, but is probably becasue the crystalline YAG occupies a smaller volume than the glass it replaces; crystallisation leaves small cracks. The grain boundary phase is a necessary evil in these materials, it is a remnant of the densification process.

Another promising ceramic family is based on tetragonal zirconia, $ZrO_2$. The tetragonal zirconia is dispersed in a matrix typically mullite, alumina or cubic zirconia. The tetragonal zirconia toughens by a process known as transformation toughening. Basically, the composite is fired at high temperature (at least 1100° C.), when the ceramic densifies, and the zirconia is in its high temperature tetragonal form. On cooling, the tetragonal zirconia attempts (and fails) to transform to its low temperature monoclinic form. The matrix constrains the zirconia in its tetragonal form which at room temperature is metastable. This transformation would be accompanied by a 3-5 volume percent increase in each zirconia crystal. The effect is to put the entire matrix into compressive stress, rather like prestressed concrete. Any crack running into such a ceramic tends to trigger the tetragonal to monoclinic transformation which generates compressive stresses which tend to close off the crack. The process becomes more efficient, the stiffer the matrix, because the stiff matrix is better able to constrain the metastable tetragonal form at room temperature. The process is less effective at high temperature, and there is no toughenning at all above 900° C. because the tetragonal zirconia is now stable not metastable.

Whilst it would be desirable to attempt to zirconia toughen sialons because they are stiff (and hard and strong) but are also quite tough to start with, workers in this field have found that zirconia reacts chemically with $\beta'$-sialon and is partly reduced to zirconium oxynitrides.

We have now surprisingly found that O'-sialon does not react with zirconia but instead forms a stable composite with it. The present invention is based upon this discovery.

Accrdingly, the present invention provides a ceramic mataral which comprises a composite of zirconia and O'-sialon or silicon oxynitride.

The ceramic material of the invention may contain from 5 to 95 volume percent zirconia based on the total volume of the composition.

The ceramic material may comprise a dispersion of zirconia in an O'-sialon matrix and such a dispersion is obtained when the amount of zirconia is from 5 to 30 volume percent, preferably from 15 to 25 volume percent based on the total volume of the composition.

The ceramic materials of the present invention may include in the O'-sialon matrix a solid solution of zirconia with yttria, ceria, lanthanum oxide, calcium oxide, magnesium oxide or a rare earth metal oxide.

The present invention furthermore provides a process for the preparation of a ceramic material as hereinbefore described which process comprises the reaction sintering at a temperature in the range of from 1500° to 1750° C. of zircon, silicon nitride and optionally alumina or a precursor for alumina, optionally in the presence of a reaction sintering aid or a precursor therefor.

The primary function of the metal oxide sintering aid is to form a solid solution with the zirconia. Thus, the sintering aid reacts initially with the alumina and the surface layer of silica on the silicon nitride to form a transient liquid phase which dissloves the silcon nitride and the zircon and from which the zirconia and the O'-sialon precipitate.

The sintering aid used in this process may be, for example, yttria, ceria, lanthanum oxide, calcium oxide, magnesium oxide of a rare earth oxide, or a precursor for one of these compounds. Thus, we have found that, the alumina for the above described process and the sintering aid may be provided by the use of a spinel.

Preferred spinels for use in the process of the invention are those of magnesium, calcium or barium, with the compound of the formula $MgAl_2O_4$ being particularly preferred for use.

The spinel is incorporated into the mixture which is sintered in an amount sufficient to provide the desired amount of aluminium in the final O'-sialon matrix. The spinel is thus preferably used in an amount of up to 10% by weight based on the weight of the zircon and silicon nitride, preferably in an amount of from 6 to 8% by weight.

Other precursors of various of the components incorporated into the mixture reaction sintered according to the above process may also be used. Thus, the ceramic materal of the invention comprising a dispersion of zirconia in an O'-sialon matrix may be prepared by reaction sintering a mixture of zircon, silicon nitride, a metal silicate and alumina.

The metal silicate may be, for example, a silicate of calcium, magnesium or barium. It will be appreciated that on heating to sintering temperatures the metal silicate will react with some of the zircon and silicon nitride to form a liquid phase which promotes reaction and densificiation by a solution-precipitation mechanism. The oxides which may be used as sintering aids may also be provided by precursors such as carbonates or bicarbonates which decompose to the oxide under the sintering conditions. For example calcium oxide and magnesium oxide as sintering aids may be provided by calcium carbonate or magnesium carbonate respectively.

We have also found that instead of using zircon ($ZrSiO_4$) in the process as described above, a mixture of zirconia ($ZrO_2$) and silica ($SiO_2$) may be used. This modification has the advantage that, whereas in zircon the ratio of $ZrO_2$ to $SiO_2$ is fixed, it is possible to vary the ratio of zirconia to silica, as required. This may, in some instances, be particularly advantageous.

The present invention thus provides in a further aspect a process for the preparation of a ceramic material comprising a composite of zirconia and O'-sialon, which process comprises the reaction sintering at a temperature in the range of from 1500° to 1750° C. of a mixture of zirconia, silica, silicon nitride and optionally alumina or a precursor therefor, optionally in the presence of a reaction sintering aid or a precursor therefor.

The reaction sintering aid, or the precursor therefor, used in this alternative embodiment of the invention is as hereinbefore described. Furthermore, the alumina for this process and the sintering aid may be provided by the use of a compound, e.g. a spinel as hereinbefore described.

The present invention will be further described with reference to the following Examples.

EXAMPLE 1

The following compositions were ball milled for 24 hours under isopropanol, using a 3 mm zirconia mixing media. The slurry was pan dried and the powder isostatically pressed at 20,000 psi into billets.

The ratio of silicon nitride to zircon to alumina was kept constant, whilst the yttria content was varied from 0.8% (by weight) to 20% (by weight).

| Composition A | | |
|---|---|---|
| Zircon | 56.0 g | |
| Silicon nitride | 38.5 g | |
| Alumina | 4.7 g | |
| Yttria | 0.8 g | |
| Composition B | | |
| Zircon | 55.2 g | |
| Silicon nitride | 38.3 g | |
| Alumina | 4.6 g | |
| Yttria | 1.5 g | (represents 4% by weight based on $ZrO_2$) |
| Composition C | | |
| Zircon | 55.2 g | |
| Silicon nitride | 38.0 g | |
| Alumina | 4.6 g | |
| Yttria | 3.0 g | (represents 6% by weight based on $ZrO_2$) |
| Composition D | | |
| Zircon | 54.8 g | |
| Silicon nitride | 37.7 g | |
| Alumina | 4.6 g | |
| Yttria | 3.0 g | (represents 8% by weight based on $ZrO_2$) |
| Composition E | | |
| Zircon | 54.4 g | |
| Silicon nitride | 37.4 g | |
| Alumina | 4.5 g | |
| Yttria | 3.7 g | (represents 10% by weight based on $ZrO_2$) |
| Composition F | | |
| Zircon | 52.5 g | |
| Silicon nitride | 36.1 g | |
| Alumina | 4.4 g | |
| Yttria | 7.0 g | (represents 20% by weight based on $ZrO_2$) |

The above compositions were fired at 1700° C. for 5 hours in a carbon element furnace.

Figure 2:
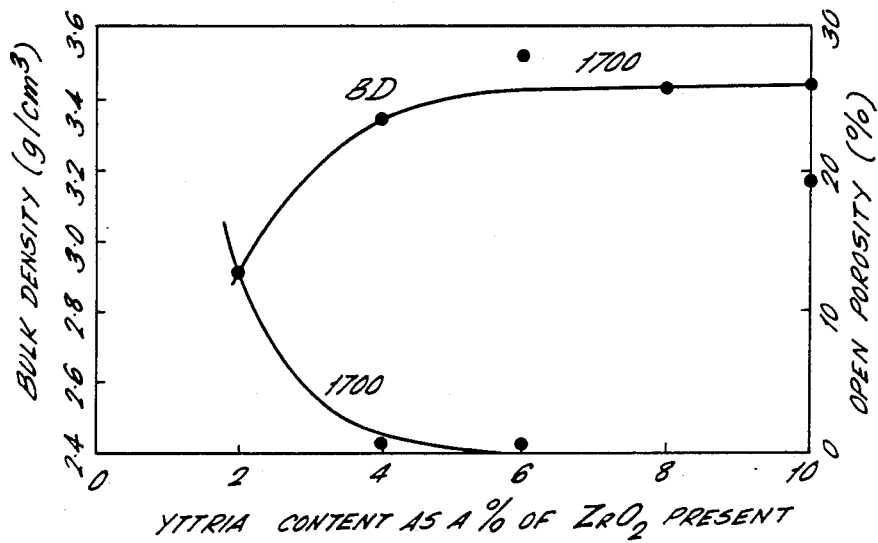

X-ray diffranction traces of the fired, crushed ceramics indicated that with no yttria addition the zirconia is monoclinic with a trace of nitrogen stabilized cubic zirconia. The amount of tetragonal zirconia increases with yttria content and reaches >95% for Composition E. An X-ray diffraction trace for composition E is given in FIG. 1. The X-ray diffraction trace was taken with copper K$\alpha$ radiation. The porosity and density are shown in FIG. 2. With low yttria additions, insufficient transient liquid phase is generated to give complete densification. At medium yttria addition the ceramic partly densifies whilst at high yttria additions the ceramic is better than 95% dense with most of the zirconia stabilized as tetragonal zirconia.

EXAMPLE 2

Zircon (55.4 g), silicon nitride (38.1 g) and magnesium spinel, $MgAl_2O_4$. (6.4 g) were thoroughly mixed together and isostatically pressed at 20,000 psi. The billets were then fired for 3 hours at a temperature of 1500° C. At this temperature the product was zirconia dispersed in an O'-sialon matrix. An electron micrograph of the product revealed a glass grain boundary phase at a magnification of 5000.

EXAMPLE 3

Zirconia (36.5 g), silica (17.8 g), silicon nitride (37.4 g), alumina (4.5 g) and yttria (3.7 g) were thoroughly mixed together and isostatically pressed at 20,000 psi. The billet was then fired for 5 hours at 1750° C. The product was zirconia dispersed in an O'-sialon matrix and the density was 3.58 g/cm³.

EXAMPLE 4

Zircon (40.0 g), silica (9.0 g), silicon nitride (46.0 g), alumina (5.5 g) and yttria (2.2 g) were thoroughly mixed and isostatically pressed at 20,000 psi. The billet was then fired for 3 hours at 1700° C. The product was fully dense and comprised 15 volume percent zirconia and 85 volume percent of O'-sialon.

EXAMPLE 5

Zirconia (36.7 g), silica (17.9 g), silicon nitride (41.8 g) and yttria (3.7 g) were thoroughly mixed together and isostatically pressed at 20,000 psi. The billet was then fired for 5 hours at 1700° C. The product was zirconia in a silicon oxynitride matrix and the density was 3.35 g/cm$^3$.

EXAMPLE 6

Zirconia (37.9 g), silica (18.5 g), silicon nitride (38.9 g) and alumina (4.7 g) were thoroughly mixed and isostatically pressed at 20,000 psi. The billet was then fired for 5 hours at 1700° C. The product had a density of 3.47 g/cm$^3$.

Figure 3:
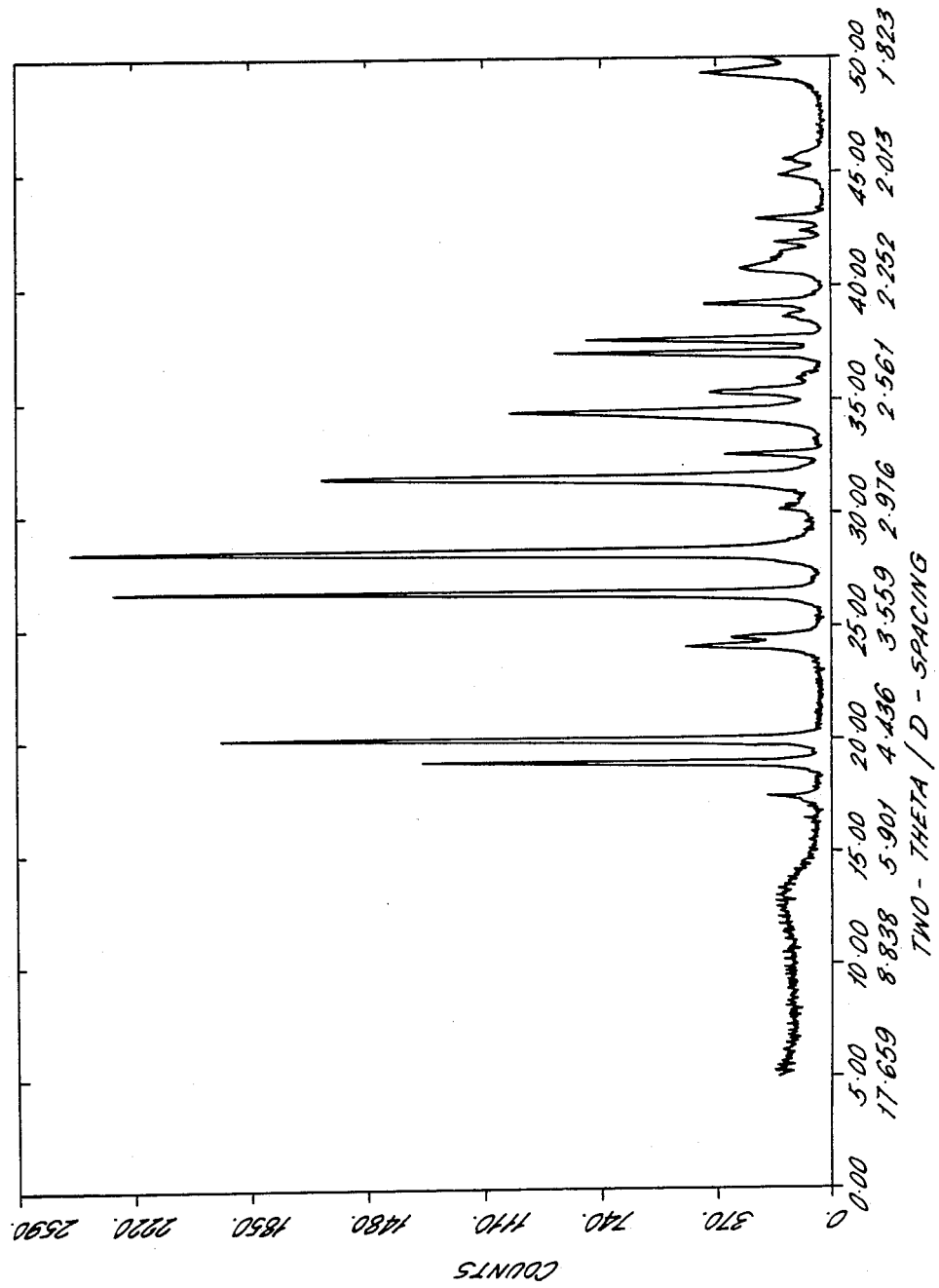

FIG. 3 is an X-ray diffraction trace of this composition taken with copper Kα radiation. This X-ray diffraction trace shows only monoclinic zirconia with the tiny peak at 30° representing a trace of zirconium oxynitride. (Yttria was ommitted from the composition because yttria stabilized ZrO$_2$ (tetragonal ZrO$_2$) would also give a peak in this position).

Figure 4:
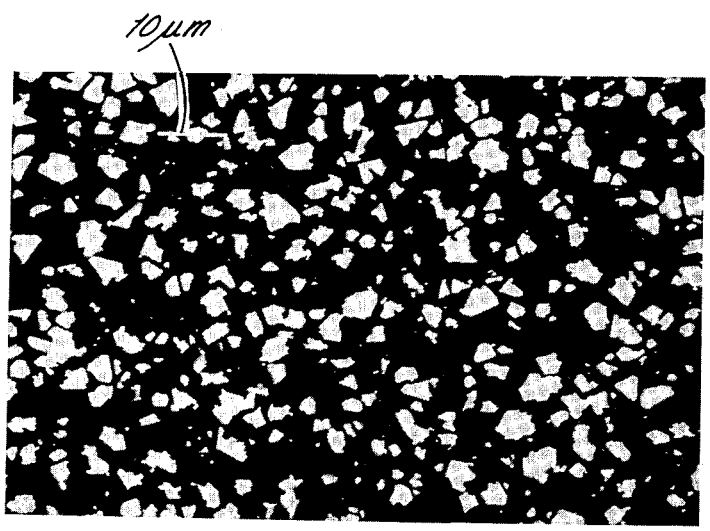

FIG. 4 is a electron micrograph of this composition taken at 1000 times magnification. The white phase is zirconia and the dark phase is O'-sialon. The marker on the photograph represents 10 micrometers.

COMPARATIVE EXAMPLE 7

Figure 5:
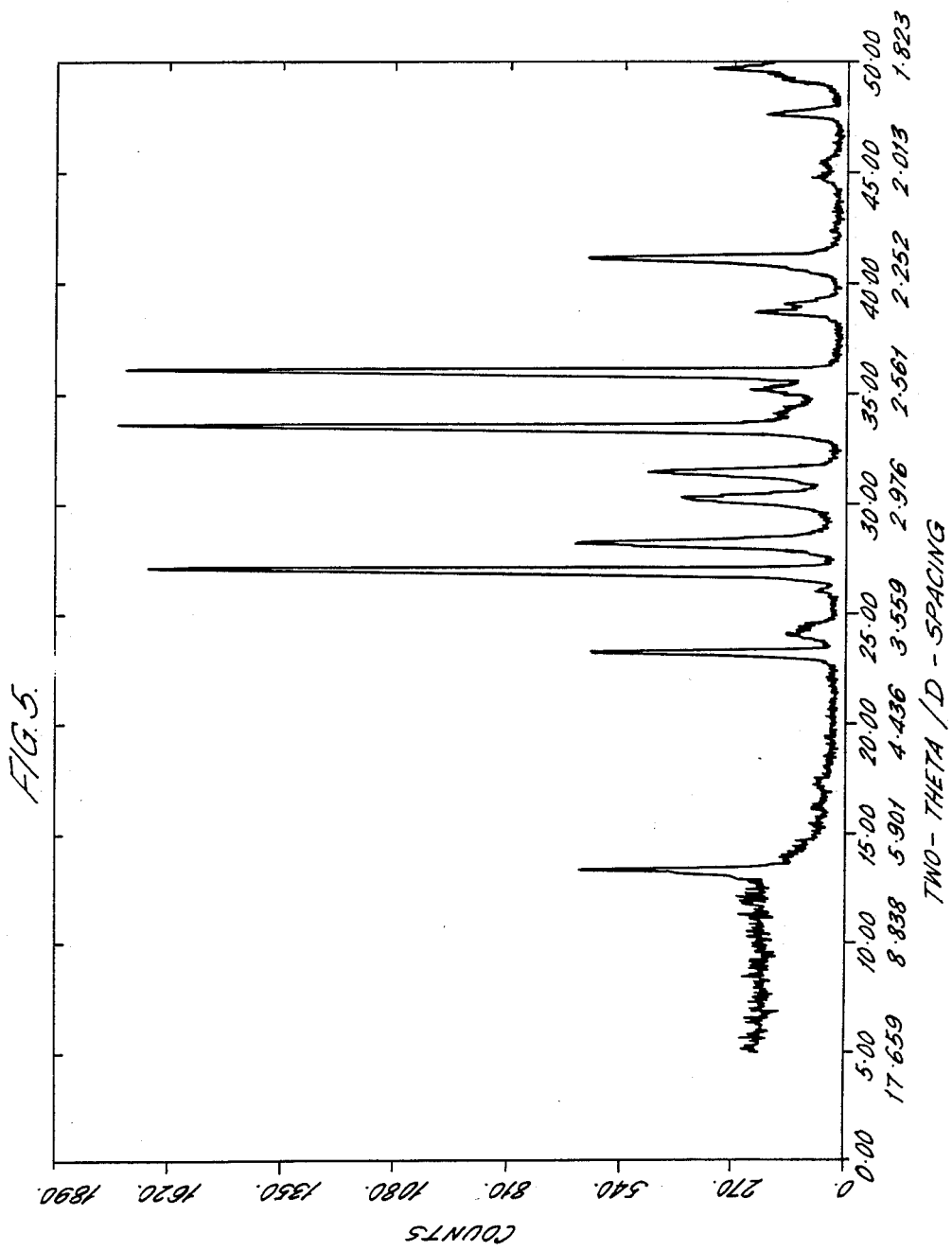

Zircon (26.7 g), silicon nitride (61.3 g) and aluminium nitride (12.0 g) were thoroughly mixed and isostatically pressed at 20,000 psi. The billet was then fired for 5 hours at 1700° C. The product was zirconia in β'-sialon and had a density of 3.46 g/cm$^3$. Although the material had densified very well without the addition of yttria, the product contained large amounts of zirconium oxynitride. This can be seen from FIG. 5 which is an X-ray diffraction trace of the composition taken with copper Kα radiation. The peak at 30° is attributable to zirconium oxynitride. Up to 25% of the zirconia is nitrogen stabilized in this composition.

We claim:

1. A process for the preparation of a ceramic material which consists essentially of a composite which is zirconia in O'-sialon, which process consists essentially of the reaction sintering at a temperature in the range of from 1500° to 1750° C. of a mixture of zircon, silicon nitride and alumina, optionally in the presence of a reaction sintering aid.

2. Process according to claim 1 wherein the sintering aid is selected from the group consisting of calcium oxide, magnesium oxide and a rare earth metal oxide.

3. Process according to claim 2 wherein the alumina for the reaction and the sintering aid are provided by the use of a precursor such as a spinel.

4. Process according to claim 3 wherein the spinel is selected from the group consisting of a spinel of magnesium and calcium.

5. Process according to claim 2 wherein the reaction sintering aid is provided by the use of a precursor for a compound selected from the group consisting of calcium oxide, magnesium oxide and a rare earth metal oxide.

6. A process for the preparation of a ceramic material as defined in claim 1, which process consists essentially of the reaction sintering of a mixture of zircon, silicon nitride, alumina and a metal silicate.

* * * * *

UNITED STATES PATENT AND TRADEMARK OFFICE
CERTIFICATE OF CORRECTION

PATENT NO.   : 4,866,013

DATED        : September 12, 1989

INVENTOR(S)  : Anseau, et al.

It is certified that error appears in the above-identified patent and that said Letters Patent is hereby corrected as shown below:

On the cover of U.S. Patent No. 4,866,013, insert:

--[73] Assignee:  Cookson Group PLC,
                  London, United Kingdom--.

Signed and Sealed this

Twenty-fifth Day of June, 1991

Attest:

HARRY F. MANBECK, JR.

Attesting Officer

Commissioner of Patents and Trademarks